United States Patent [19]
Haas et al.

[11] 3,980,889
[45] Sept. 14, 1976

[54] ARTICLE TRANSFER AND INSPECTION APPARATUS

[76] Inventors: David J. Haas, Stamford, Conn.;
Aaron Blaustein, Oysterbay, N.Y.;
Chester D. Rudd, Westwood, N.J.;
Ray C. Lapof, New York; William C. Schimpf, Forest Hill, both of N.Y.

[22] Filed: Oct. 6, 1975

[21] Appl. No.: 619,955

[52] U.S. Cl. ............................ 250/492 R; 250/453
[51] Int. Cl.² ......................................... G01T 1/00
[58] Field of Search .............. 250/449, 453, 492 R, 250/367, 519, 520; 198/76

[56] References Cited
UNITED STATES PATENTS

| | | | |
|---|---|---|---|
| 3,075,630 | 1/1963 | Fisk | 198/76 |
| 3,488,495 | 1/1970 | Schneeman | 250/453 |
| 3,514,596 | 5/1970 | Naylor | 250/519 |
| 3,832,545 | 8/1974 | Bartko | 250/367 |

Primary Examiner—Alfred E. Smith
Assistant Examiner—B. C. Anderson
Attorney, Agent, or Firm—Frank R. Trifari; Leon Nigohosian

[57] ABSTRACT

An article transfer and inspection apparatus comprising chamber-defining means, substantially impermeable to x-rays; and x-ray source for directing x-rays to a first portion of said chamber; feed and extraction conveyor systems individually having at least a portio thereof outside the chamber and respectively serving to introduce and remove an article into and from the chamber, the feed conveyor system being operable at a first speed; an inspection conveyor system located between the feed and extraction conveyor systems and at least partly disposed at the chaortion and the article into a visual image.

The apparatus can also include means for achieving a pre-determined spacing between various articles. Also, transfer apparatus for achieving pre-determined spacing between various articles. Also, the circuit for the spacing means.

19 Claims, 2 Drawing Figures

ARTICLE TRANSFER AND INSPECTION APPARATUS

This is a continuation, of application Ser. No. 458,801, filed Apr. 8, 1974 now abandoned.

BACKGROUND OF THE INVENTION

The present invention relates to apparatus for inspecting various articles, including containers, particularly such of the type lending itself to luggage inspection.

The recent high incidence of aircraft hijackings and other unlawful acts has prompted and necessitated the development of inspection systems for locating weapons in luggage so as to thwart such acts. Such systems generally have involved the use of x-rays but this leads to problems of shielding personnel and others from the irradiation. These problems also exist in various apparatus for inspecting various articles other than luggage.

One prior art inspection system employs an x-ray source that emits short pulses, or bursts, of radiation, each of such pulses not being of sufficient duration to provide a suitable read-out, or image, by itself. Therefore, it is necessary to employ an information storage system for receiving the various images of the inspected article produced by the respective pulses and storing the images for a time in order to permit adequate time to allow visual inspection thereof. This system is of limited desirability, however, at least because of the relatively high cost necessitated by the need for a short pulse generator and a relatively elaborate image storage system.

The apparatus of the present invention overcomes these disadvantages and provides a safe, reliable system that provides other significant advantages. The apparatus also provides means for achieving a pre-determined spacing between consecutive articles traveling on a material handling system.

SUMMARY OF THE INVENTION

Briefly described, the article inspection apparatus of the invention comprises chamber-defining means substantially impermeable to x-rays, an x-ray source for directing x-rays to a first portion of said chamber, a feed conveyor system adapted to be operated at a first speed to introduce the article into the chamber, an inspection conveyor system at least partly disposed at the chamber first portion and adapted to be operated at a speed at least equal to that of (and preferably exceeding) the feed conveyor, the inspection conveyor carrying the article through the first chamber portion, an extraction conveyor system to remove the article from the chamber, and means for converting x-rays passing through the chamber first portion and article, or container, into a visual image.

Also, the invention comprises apparatus for transferring articles with a pre-determined spacing between them.

PREFERRED EMBODIMENT

Figure 1:
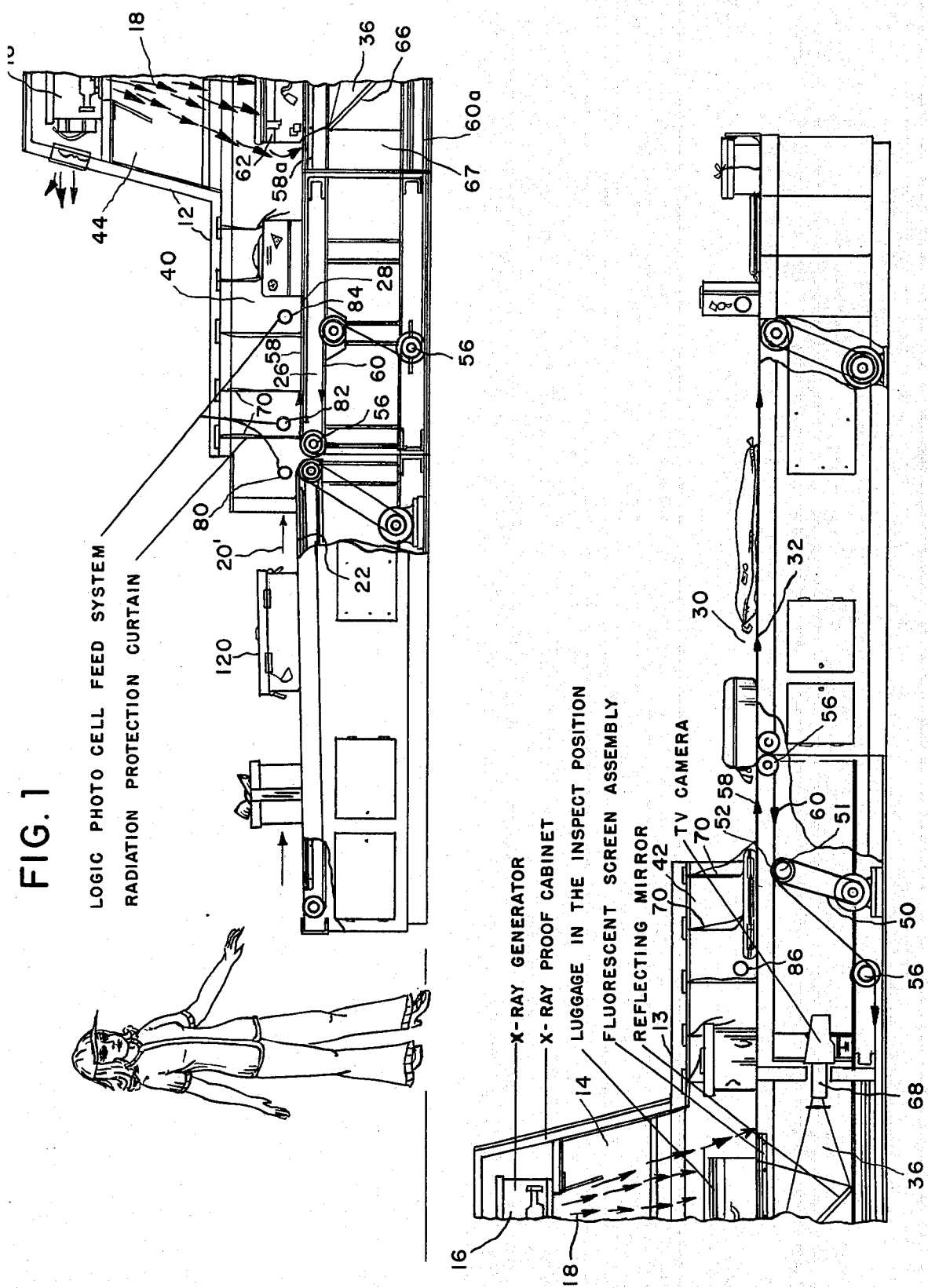
FIG. 1 is a fragmentary front elevation view of the article inspection apparatus of the present invention.

According to the one embodiment, the container inspection apparatus 10 (FIG. 1) comprises a substantially x-radiation impermeable structure 12 (e.g., a lead-lined cabinet 13 and shielding means 70 described below) that defines an interior chamber 14, an x-ray source 16 for providing an interruptible x-ray beam 18, as described below, a feed conveyor system 20 including a conveyor 22, an inspection conveyor system 26 that includes an inspection conveyor 28, an extraction conveyor system 30 comprising an extraction conveyor 32, fluorescent screen means 34 for converting x-radiation into visible radiation 38, and an imaging system 36 for transmitting the visible radiation 38.

The interior chamber 14 comprises entry and exit tunnel regions 40 and 42, respectively, and a central space 44 intermediate thereto. The conveyor belt 28 of the inspection system 26 is endless and is driven by, for example, a motor-driven chain drive system 50 that turns the pulley 52 which is connected to a roller element 54, the conveyor belt 28 being mounted on the various guide rollers 56 so that the upper and lower portions 58, 60 of the conveyor belt 28 are spaced apart by an appreciable distance, i.e., a distance significantly greater than the diameter of a guide roller 56, at at least the parts 58a, 60a of the conveyor belt 28 that pass, in the operation of the apparatus 10, through the central space 44.

At the central space 44, between the upper and lower portions 58, 60 of the conveyor belt 28, there is located the fluorescent screen 34, which is in the path of the x-ray beam 18 and receives the x-rays that pass through the article, e.g., luggage 62, and through only a single layer of the conveyor belt 28, i.e., through the part 58a of the upper portion 58.

The fluorescent screen 34 converts the x-ray beam into visible light, the x-ray being modulated or attenuated by, for example, any metallic objects that might be present in the luggage 62 as the beam passes through the luggage. The beam portion reaching the fluorescent screen 34 carries a latent image of the metallic objects, which image is reproduced into the visible radiation by the fluorescent screen. The visible image is directed to a mirror 66 disposed at a portion 67 of the central space 44 below the fluorescent screen so as to receive the visible image, image pick-up means, e.g., a camera tube 68, which is also located in the central space portion 67 between the upper and lower conveyor belt portions 58a, 60a receiving the visible image and transmitting it to a screen observed by an operator of the apparatus 10. By requiring the x-ray beam to pass through only a single layer, i.e., the top portion 58a of the conveyor belt 28, there is minimal beam attrition and minimal distortion of the latent image carried by the beam.

The belt drive mechanism 50 for the conveyor belt 28 is operated at a predetermined, but, preferably, a variable, speed, that exceeds by a significant amount, the speed at which the feed conveyor belt 22 is operated, this for the below-described reasons.

The feed and extraction conveyors 22 and 32, respectively, can be driven by a system similar to that for the intermediate inspection conveyor 28 and either or both of them can be wholly outside the chamber 14 (as shown in FIG. 1) or partly or entirely within the chamber 14 (not shown). Also, while the inspection conveyor system 26 is shown to be located completely within the chamber 14, it can have its terminal portions located outside it.

It is important that a plurality of flexible (i.e., penetrable by the inspected articles) x-ray shields or curtains 70 be located in each of the entry and exit tunnels 40 and 42, respectively, and that each shield 70 extend completely across the height and width of its respective tunnel. In a preferred embodiment, the shields 70 individually comprise a number of contiguous strips of lead-containing vinyl, such a product being sold under the trademark Lead X by Bar Ray Co., Brooklyn, New York. It is especially preferred that each shield or curtain 70 comprise two rows of contiguous strips, the strips of one row being in staggered relation with those of the other row.

The distance between the extreme, i.e., the first and last, such shields 70 should be greater than the maximum dimension of the article, e.g., a piece of luggage, along the axis of the article that coincides with the direction of motion of the article through the tunnels 40, 42, so that at least one such shield 70 will completely close each such tunnel 40, 42 at all times that an article is passing therethrough. Where the x-ray absorption of a single such shield 70 is sufficiently high so as to absorb at least the amount of x-radiation that will result in tolerable and safe x-ray levels outside the apparatus 10, two such shields 70 may be employed in each of the tunnels so long as the distance between them exceeds the above maximum dimension of the article. Where extra precautions are to be taken against the possibility of unsafe x-ray levels outside the apparatus and/or where the absorption of a single shield 70 is not adequate to lower to acceptable levels the radiation outside the apparatus 10, additional shields 70 are provided in each tunnel 40, 42 to ensure the attainment of acceptable exterior radiation levels at all times. It is especially preferred that three or more, e.g., five, such shields 70 be employed in each tunnel, 40, 42, with the separation between the extreme shields 70 being at least twice the above described maximum dimension of the luggage or other article.

It is preferred that the voltage of the x-ray source 16 be variable to permit controlling the penetration by the x-ray beam, thereby allowing the beam intensity to be adjusted in accordance with the x-ray absorption characteristics of, e.g., the article (e.g., luggage), the contents thereof and/or, the conveyor material.

Because the visible light image 38 from the fluorescent screen 34 may be of a relatively low light level, especially where a low level x-radiation is employed, it is preferred that the camera 68 be equipped with an image intensifying device. The image generating system of the present invention thus can provide a dynamic stereoscopic image instead of the less desirable static image that is produced by previous utilizing image storage devices.

In a further preferred embodiment, the apparatus 10 also comprises an article sensing-system comprising, for example, a plurality of photoelectric cells distributed in the chamber 14 along the path of the transported articles.

According to a preferred arrangement a first photoelectric cell 80 is disposed at the terminal part of the feed conveyor belt 22 located adjacent the inspection conveyor belt 28, the cell 80 (as well as the other cells) being located so as to permit its detection or sensing of all of the articles, however small, contemplated to be transferred. A second photoelectric cell 82 is located at a point adjacent the inspection conveyor belt 28, which point may be within the entry tunnel 40 (as shown in FIG. 1) and preferably is proximate the entry end of the tunnel 40 and in all cases is most preferably disposed between the first photocell 80 and the central space 44 at which the x-ray beam 18 is located. A third and fourth photocells 84 and 86, respectively, are located respectively between the second photocell 82 and the central space 44, and at the exit side of the central space 44.

The first and second photocells 80 and 82 co-act to control the feed conveyor belt system 20 and the third and fourth photocells 84 and 86 can act independently of each other to control the inspection conveyor belt system 26, and, preferably, the x-ray source 16 in the manner described below. The photocells 80 to 86 are included in a control circuit (FIG. 2) that preferably is incorporated into the apparatus 10 as a separate or integral part thereof.

In the operation of the apparatus 10, the feed conveyor belt 22 is operated at a first speed, e.g., about 30 feet per minute, to carry luggage or other articles to the entry tunnel 40, the inspection conveyor belt 26, which preferably operates at a greater speed than the feed conveyor system, e.g., about 60 feet per minute, receiving the article and carrying it through the central space 44 where the article (e.g., 62 in FIG. 1) is exposed to the x-ray beam 18, which is of an intensity level sufficient to penetrate the article. After it is exposed, the article is carried through the exit tunnel 42 by the inspection belt 28 and transferred to the extraction conveyor belt 32, which preferably operates at a speed at least equal to the inspection belt to avoid any accumulation of the articles in the chamber 14. Because the inspection conveyor belt 28 is operated at a greater speed than the feed conveyor belt 22, the transported articles are carried through the chamber 14 at a rate greater than that at which they approach the entry tunnel 40, thereby providing between the articles a proper spacing that results in one or more shields 70 closing the tunnels (i.e., extending completely across the tunnel height and width) at a given time than in the situation where the various articles are permitted to be closely spaced, this latter situation permitting all of the shields to be raised with certain spacings between the articles. With an article-sensing system (described below) included with the apparatus, the feed belt can be operated at a speed exceeding that of the inspection belt.

As an added precaution, the photocells 80 and 82 and their associated circuitry, permit the automatic stoppage of the feed conveyor system 20 in, for example, the situation where a first article has passed the first photocell 80 but has not completely passed the second photocell 82 (which is spaced, for example, at least one article length from the first photocell and a second article is located in front of the first photocell 80. In this situation, were it not for the photocell control system (FIG. 2), there would be a greater possibility of the consecutive articles being sufficiently close to permit all of the shields 70 to be raised simultaneously, thus creating a high radiation level at the openings of the entry and exit tunnels 40, 42 and the possibility of personnel being exposed to the radiation. However, because the control system, in this situation, stops the feed conveyor system 20, e.g., until the first, i.e., proceeding, article has passed the second photocell 82 or for a given time period (the latter being achievable with a suitable timer mechanism), the progress of the following articles, i.e., those approaching the entry tunnel 40, is stopped, permitting the preceding article to continue moving through the tunnel 40 and increasing the space between such preceding article and those following. When the desired spacing between the articles has been attained (e.g., when the preceding article has passed the second photocell 82 so that the spacing between the consecutive articles is about the same as the distance between the photocells 80, 82 or when the predetermined time for stoppage of the feed conveyor belt has lapsed), then the feed conveyor system 20 is again activated and the article transport process and the inspection process are resumed.

To ensure against the accumulation of articles in the chamber 14, the photocells 84 and 86 are independently employed with suitable timer circuits (FIG. 2) to ascertain the passage of the transported articles through the chamber 14. To do this, each photocell 84, 86 and its associated timer system, which is pre-set for a certain time period, are operated such that the time between consecutive transported articles passing between the photocell (i.e., 84 or 86) and its associated light source, is measured. If the time lapse between consecutive articles exceeds the certain time period for which the timer system is set, then the photocell, 84 or 86, as the case may be, stops the motion of its associated conveyor belt (i.e., inspection belt 28) and, preferably, turns off the x-ray source 16 by interrupting the power source of the x-ray source 16. This stoppage of belt 28 and the x-rays permits the operator to remove the articles from the chamber 14, as, for example, through a removable or openable cabinet panel.

The article sensing system is shown in greater detail in FIG. 2 of the drawing, to which reference now will be made. The output of photocell 82 is coupled to the input of a one-shot multivibrator 88. The output of MV 88 is in turn connected to one input of NAND gate 90. A second input of gate 90 is connected to the output of photocell 80. The output of gate 90 is connected to one end of a control relay coil 92, the other end of which is connected to a source of DC voltage (not shown) via terminal 94. The control relay coil 92 operates a set of contacts 96 which control the operation of the input conveyor motor controller 98 in a manner that is well known in the art. The motor controller in turn will deactivate the feed conveyor system 20 (FIG. 1) whenever the spacing between consecutive articles of luggage is less than a predetermined distance apart.

Figure 2:
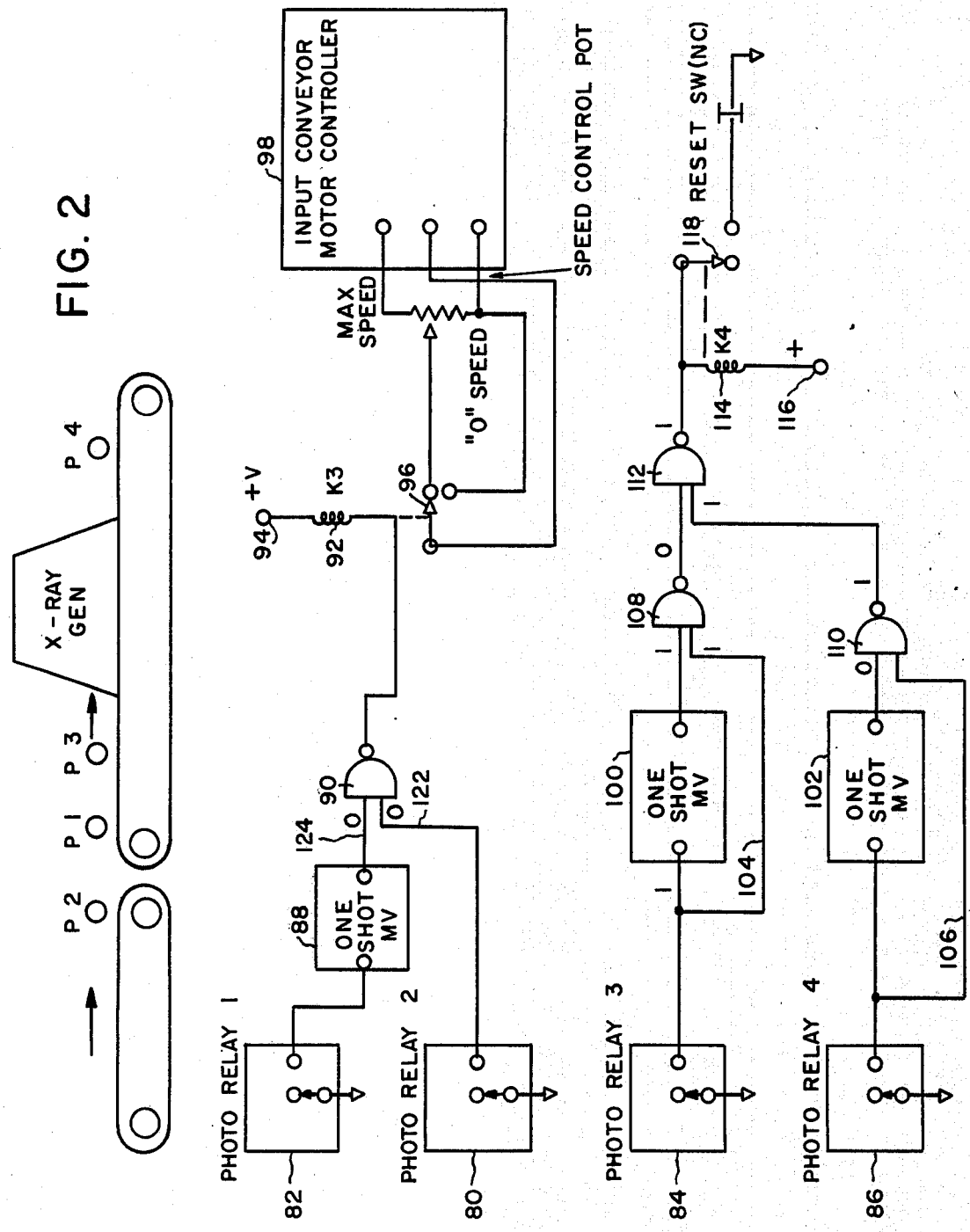
FIG. 2 is a schematic circuit diagram, according to one embodiment, of the control system of the invention apparatus.

FIG. 2 also shows the details of the control system for the inspection conveyor belt system 26. This includes the photocells 84 and 86, each having an output line connected to an input of one-shot multivibrators 100 and 102, respectively, and also via leads 104 and 106, respectively, to one input of NAND gates 108 and 110, respectively. The second input of gates 108 and 110 is connected to the output of MV's 100 and 102, respectively. The outputs of NAND gates 108 and 110 are connected to first and second input terminals of a NAND gate 112. The output of gate 112 is connected to one end of a second control relay coil 114, the other end of which is connected to the aforesaid DC voltage source viz a terminal 116. The control relay coil 114 operates a set of contacts 118 which in turn control the operation of the inspection conveyor belt system 28.

In the absence of any luggage articles on the conveyor systems, the photocells 80 and 82 supply logic 0 signals to the inputs of NAND gate 90, which in turn supplies a logic 1 signal to relay coil 92. The coil 92 is then deenergized and the contacts 96 are (open, closed) whereby the controller 98 is signalled to provide motor drive for the feed conveyor system. The feed conveyor then continuously drives the feed belt 22.

As a bag 120 moves along feed conveyor 22, it first passes between a light reflector (not shown) and the photocell assembly 80 (containing a light source). Photocell assembly 80 then supplies a logic 1 signal to input line 122 of NAND gate 90. However, since the second input 124 of gate 90 still receives a logi 0 signal from photocell assembly 82 via one shot MV 88, the gate 90 does not change state and it continues to supply a logic 1 signal to control relay coil 92. The system operation continues as before. When the article 120 passes photocell 80, but before it reaches photocell 82, the photocell 80 reverts to its original condition in which it supplies a logic 0 signal to NAND gate 90. The system continues to operate as before.

As the bag 120 proceeds, it passes between photocell 82 and a second light reflector, also not shown. Photocell 82 supplies a positive going pulse to one-short MV 88, which does not respond to positive going pulses and so continues to supply a logic 0 signal to input 124 of gate 90. The output of gate 90 remains at logic 1 so that the relay coil 92 is still deenergized. When the rear end of luggage article 120 passes photocell 82, the photocell applies a negative going pulse to the input of MV 88. The MV responds thereto by switching into its unstable state to supply a logic 1 signal at its output of a predetermined pulse width sufficient to ensure deactivation of the feed conveyor system if a second article of luggage passes between photocell 80 and its associated light source before MV 88 reverts back to its stable state. At this time, if the photocell 80 receives light, it supplies a logic 0 signal to input 122 of NAND gate 90 so that the gate remains in its original condition despite the logic 1 signal at input 124. If a second article of luggage does not appear at photocell 80 within the time duration of the MV output pulse (logic 1 signal), then the system continues in normal operation and MV 88 reverts to its stable state wherein it again supplies a logic 0 signal to NAND gate 90. The subsequent appearance of a second article of luggage at photocell 80 causes the above cycle of operation to begin all over again.

In the event that two successive articles are too closely spaced, then the second article will interrupt the light to photocell 80 while the MV 88 still supplies the logic 1 signal to input 124 of gate 90. Photocell 80 then supplies a logic 1 signal to input 122 and since both inputs of NAND gate 90 simultaneously receive logic 1 signals, the gate produces a logic 0 signal at its output and also to relay coil 92. The relay is then energized and operates its contacts 96 which signal motor controller 98 that the luggage articles entering the inspection conveyor system are too closely spaced. The controller 98 responds by deactivating the motor drive to the feed conveyor system 22 which stops same. This allows the bags on the inspection conveyor to be moved along without danger of a pile-up effect. When the bags are cleared, the photocells will revert to the logic 0 state, whereupon NAND gate 90 will switch back to its original state and will supply a logic 1 signal to relay coil 92. As described above, a logic 1 signal at coil 92 operates the relay contacts so that controller 98 signals for motor drive is the feed conveyor system 22.

As the luggage moves between photocells 82 and 84, photocells 84 and 86 supply logic 0 signals to NAND gates 108 and 110, which in turn supply logic 1 signals to NAND gate 112. NAND gate 112 in turn supplies a logic 0 signal to control relay coil 114 which holds contacts 118 in the position shown. The motor drive for the inspection conveyor 58 continues to drive the conveyor belt.

As the luggage proceeds along inspection conveyor 58, it then passes between a third light source, not shown, and photocell 84. The one-shot MV 100 is not affected by the positivegoing pulse received at its input from photocell 84. NAND gate 108 receives a logic 1 signal from photocell 84 on the input line 104. However, since the NAND gate input from MV 100 still receives a logic 0 signal, the NAND gate continues to supply a logic 1 output signal to NAND gate 112. NAND gate 110 also supplies a logic 1 signal at this time to NAND gate 112 and so the operation continues as before. When the rear end of the luggage article passes photocell 84, the input on line 104 drops to a logic 0 signal, so that NAND gate 108 will now change state. The negative going pulse at the input of one-shot MV 100 triggers it into its unstable state so that it supplies a logic 1 signal to NAND gate 108 for a given period of time. If a second piece of luggage does not come along to trigger photocell 84 within said given time period, the one-shot MV 100 reverts to its stable gate 108. However, if a second piece of luggage arrives at the photocell 84 within said given time period, a logic 1 signal appears on line 104. The NAND gate 108 then receives a logic 1 signal on both of its input lines and it in turn supplies a logic 0 signal to NAND gate 112. The latter gate in turn switches over and now supplies a logic 1 signal to relay coil 114. The relay coil is energized in response to a logic 1 signal whereupon its contacts 118 switch over to signal the drive system for the inspection conveyor to stop because at least two articles of luggage are too closely spaced together. An attendant may then remove the offending article of luggage, whereupon the system will once again be ready for normal operation. The photocell 86 and the circuit elements controlled thereby operate in a similar manner to stop the inspection conveyor in the event that two pieces of luggage are too closely spaced in the exit portion of the chamber 14.

What is claimed:

1. An article inspection apparatus capable of continuous operation for at least part of the operating time thereof, comprising:
    a. chamber defining means substantially impermeable to x-rays;
    b. entry and exit portions connected with said chamber which is located between said entry and exit portions;
    c. flexible x-ray shielding means disposed at said entry and exit portions;
    d. an x-ray source for directing x-rays to a first portion of said chamber;
    e. first conveyor means for introducing an article into said chamber;
    f. means for driving said first conveyor means at a fist speed;
    g. an inspection conveyor system having at least a portion thereof disposed at said chamber first portion and serving to carry said article through said chamber first portion;
    h. means for driving said inspection conveyor system at a second speed exceeding said first speed;
    i. second conveyor means for removing said article from said chamber; and
    j. means for converting said x-rays passing through said first portion and said article into a visual image.

2. An article inspection apparatus as defined in claim 1, wherein said first conveyor means comprises a feed conveyor system disposed at least partly outside said chamber.

3. An article inspection apparatus as defined in claim 1, wherein said second conveyor means comprises an extraction conveyor system disposed at least partly outside said chamber.

4. An article inspection apparatus as defined in claim 1, wherein said inspection conveyor system comprises a conveyor belt comprising a first portion for carrying said article and a second return portion spaced from said first portion, said x-ray conversion means comprising fluorescent screen means disposed between said first and second belt portions so as to intercept said x-rays.

5. An article inspection apparatus as defined in claim 4, wherein said x-ray conversion means further comprises means for reflecting image radiation from said fluorescent screen means and camera means for receiving and transmitting said image embodied in said reflected radiation.

6. An article inspection apparatus as defined in claim 5, wherein said camera means comprises an image intensifier oriented to receive an image from said mirror.

7. An article inspection apparatus as defined in claim 1, wherein said shielding means individually comprise a plurality of suspended contiguous strips of substantially x-ray impermeable material, respective said shields extending completely across said entry and exit tunnels.

8. An article inspection apparatus as defined in claim 1, wherein said inspection conveyor system comprises an inspection conveyor belt and said article has a certain maximum length dimension oriented in the direction of motion of said inspection conveyor belt, the extreme ones of said shielding means located in each said tunnel being spaced apart by a distance significantly exceeding said maximum length dimension.

9. An article inspection apparatus as defined in claim 1, wherein said first and second conveyor systems respectively comprise feed and extraction conveyor belts and said inspection conveyor system comprises an inspection conveyor belt, said inspection conveyor belt being located at least partly in said chamber and said feed and extraction conveyor belts individually being at least partly located outside said chaamber, one end of said feed conveyor belt being proximate to one end of said inspection conveyor belt and one end of said extraction conveyor belt being proximate the other end of said inspection conveyor belt, said apparatus comprising article sensing means comprising first and second article sensing elements adapted to co-act to control said feed conveyor belt.

10. An article inspection apparatus as defined in claim 9, wherein said first and second article sensing elements respectively comprise first and second photoelectric cell means disposed adjacent to respectively said first and said inspection conveyor belts so as to sense said articles passing thereby and said article sensing means comprises means for stopping said feed conveyor belt when at least a portion of a first said article is located at least partly between said first and second photoelectric cell means and a second said article concurrently is located in front of said first photoelectric cell means.

11. An article inspection apparatus as defined in claim 9, further comprising at least one further article sensing means for controlling said inspection conveyor belt, said further means comprising timing means for determining the distance between consecutive said articles.

12. An article inspection apparatus as defined in claim 11, comprising at least two further article sensing means operatively independent of each other, said further sensing means being disposed in said chamber adjacent said inspection conveyor belt and at least one of said further sensing means being disposed beyond each end of said chamber first portion.

13. An article inspection apparatus as defined in claim 12, comprising two said further article sensing means respectively comprising third and fourth photoelectric cell means disposed so as to sense said articles passing thereby and circuit means for stopping said inspection conveyor belt when a third said article is located in front of said third photoelectric cell and a fourth said article is located between said third and fourth photoelectric cells.

14. An article inspection apparatus as defined in claim 1, wherein said x-ray source is disposed above said inspection conveyor system, said x-rays being directed downward to said chamber first portion.

15. An article inspection apparatus capable of continuous operation for at least part of the operating time thereof, comprising:
  a. chamber defining means substantially impermeable to x-rays, said chamber defining means comprising entry and exit portions for ingress and egress and flexible x-ray shielding means disposed at said entry and exit portions;
  b. an x-ray source for directing x-rays to a first portion of said chamber;
  c. means for introducing an article into said chamber at a first rate of speed;
  d. an inspection conveyor system having at least a portion thereof disposed at said chamber first portion and serving to carry said article through said chamber first portion;
  e. means for driving said inspection conveyor system at a second speed exceeding said first speed;
  f. means for removing said article from said chamber; and
  g. means for converting said x-rays passing through said first portion and said article into a visual image.

16. An article inspection apparatus capable of continuous operation for at least part of the operating time thereof, comprising:
  a. chamber defining means substantially impermeable to x-rays, said chamber defining means comprising entry and exit portions for ingress and egress and flexible x-ray shielding means disposed at said entry and exit portions;
  b. an x-ray source for directing x-rays to a first portion of said chamber;
  c. means for introducing an article into said chamber;
  d. an inspection conveyor system having at least a portion thereof disposed at said chamber first portion and serving to carry said article through said chamber first portion;
  e. means for removing said article from said chamber;
  f. means for converting said x-rays passing through said first portion and said article into a visual image; and
  g. means for sensing the relative positions of a number of the articles.

17. An article inspection apparatus capable of continuous operation for at least part of the operating time thereof, comprising adjacent feed and transfer conveyor systems, said feed conveyor system comprising a first conveyor belt and means for driving said first belt at a first speed and said transfer conveyor system comprising a second conveyor belt and means for driving said second belt at a second speed significantly exceeding said first speed, whereby articles are carried to said second belt by said first belt, a third conveyor system comprising a third conveyor belt and means for driving said third belt at a third speed at least equal to said second speed, said second belt being disposed between and in proximity with said first and third belts, and being substantially aligned therewith, chamber defining means substantially impermeable to x-rays, said chamber defining means being associated with said transfer conveyor system and comprising entry and exit portions for ingress and egress of said article, flexible x-ray shielding means disposed at said entry and exit portions, an x-ray source for directing x-rays to a first portion of said chamber so as to impinge on an article located thereat, means for converting said x-rays passing through said first portion and said article into a visual image, and article sensing means comprising first and second article sensing elements adjacent at least one of said first and second conveyor belts and adapted to co-act to control said first belt.

18. An article inspection apparatus capable of continuous operation for at least part of the operating time thereof, comprising:
  a. chamber defining means substantially impermeable to x-rays, said chamber defining means comprising entry and exit portions with a first portion of said chamber located therebetween;
  b. an x-ray source for directing x-rays to said first portion of said chamber;
  c. flexible x-ray shielding means disposed at said entry and exit portions;
  d. an article transport system having at least a portion thereof disposed at said chamber first portion and serving to carry said article through said chamber first portion; and
  e. means for converting said x-rays passing through said first portion and said article into a visual image.

19. An article inspection apparatus as claim 18, further comprising means for sensing the relative positions of a number of the articles.

* * * * *

UNITED STATES PATENT AND TRADEMARK OFFICE
CERTIFICATE OF CORRECTION

PATENT NO. : 3,980,889
DATED : September 14, 1976
INVENTOR(S) : DAVID J. HAAS ET AL It is certified that error appears in the above-identified patent and that said Letters Patent are hereby corrected as shown below:

In the Title Page, Section [73] missing, insert as a separate paragraph,

--Assignee: North American Philips Corporation, New York, N.Y.--

In the Title Page, Abstract, Section [57], line 5,

"portio" should be --portion--.

line 11, should read as follows, -- at least partly disposed at the chamber first portion, the inspection conveyor system being operable at a second speed at least equal to the first speed and serving to carry the article through the chamber first portion; and means for converting x-rays passing through the first portion and the article-

UNITED STATES PATENT AND TRADEMARK OFFICE
CERTIFICATE OF CORRECTION

PATENT NO. : 3,980,889

DATED : September 14, 1976

INVENTOR(S) : DAVID J. HAAS ET AL

It is certified that error appears in the above-identified patent and that said Letters Patent are hereby corrected as shown below:

Column 3, line 55, after "previous" insert --systems--.

Column 4, line 56, after "photocell" insert --)--.

Column 5, line 67, "0" should read --"0"--.

Column 6, line 1, "1" should read --"1"--;

line 10, "1" should read --"1"-- ;

line 12, "0" should read --"0"--;

line 15, "1" should read --"1"--;

line 19, "0" should read --"0"--;

line 25, "0" should read --"0"--;

line 26, "1" should read --"1"--;

line 31, "1" should read --"1"--;

line 37, "0" should read --"0"--;

line 39, "1" should read --"1"--;

line 41, "1" should read --"1"--;

UNITED STATES PATENT AND TRADEMARK OFFICE
CERTIFICATE OF CORRECTION

PATENT NO. : 3,980,889
DATED : September 14, 1976
INVENTOR(S) : DAVID J. HAAS ET AL Page 3 of 4

It is certified that error appears in the above-identified patent and that said Letters Patent are hereby corrected as shown below:

Column 6, line 44, "0" should read --"0"--;

line 51, "1" should read --"1"--;

line 52, "1" should read --"1"--;

line 54, "1" should read --"1"--; and "0" should read --"0"--;

line 63, "0" should read --"0"--;

line 65, "1" should read --"1"--;

line 66, "1" should read --"1"--.

Column 7, line 2, "0" should read --"0"--;

line 3, "1" should read --"1"--;

line 5, "0" should read --"0"--;

line 13, "1" should read --"1"--;

line 16, "0" should read --"0"--;

line 17, "1" should read --"1"--;

UNITED STATES PATENT AND TRADEMARK OFFICE
CERTIFICATE OF CORRECTION

PATENT NO. : 3,980,889
DATED : September 14, 1976
INVENTOR(S) : DAVID J. HAAS ET AL It is certified that error appears in the above-identified patent and that said Letters Patent are hereby corrected as shown below:

Column 7, line 18, "1" should read --"1"--;

line 22, "0" should read --"0"--; and "now" should read --not--;

line 25, "1" should read --"1"--;

line 31, "1" should read --"1"--;

line 32, "1" should read --"1"--;

line 33, "0" should read --"0"--;

line 35, "1" should read --"1"--;

line 36, "1" should read --"1"--.

Claim 10, line 7, after "comprises" insert --circuit--.

Signed and Sealed this

Seventh Day of June 1977

[SEAL]

Attest:

RUTH C. MASON
*Attesting Officer*

C. MARSHALL DANN
*Commissioner of Patents and Trademarks*